United States Patent
Held et al.

(10) Patent No.: US 7,818,324 B1
(45) Date of Patent: Oct. 19, 2010

(54) SEARCHING INDEXED AND NON-INDEXED RESOURCES FOR CONTENT

(75) Inventors: David Held, Brooklyn, NY (US); Jeffrey Korn, New York, NY (US)

(73) Assignee: Google Inc., Mountain View, CA (US)

( * ) Notice: Subject to any disclaimer, the term of this patent is extended or adjusted under 35 U.S.C. 154(b) by 283 days.

(21) Appl. No.: 11/940,241

(22) Filed: Nov. 14, 2007

(51) Int. Cl.
*G06F 17/30* (2006.01)
(52) U.S. Cl. .................................................. 707/741
(58) Field of Classification Search .................. 707/3, 707/10, 741; 714/38

See application file for complete search history.

(56) References Cited

U.S. PATENT DOCUMENTS

2005/0246588 A1* 11/2005 Deng et al. .................... 714/38

* cited by examiner

*Primary Examiner*—Etienne P LeRoux
(74) *Attorney, Agent, or Firm*—Fish & Richardson P.C.

(57) ABSTRACT

Methods, systems, and apparatus, including computer program products, for searching indexed and non-indexed content. One method includes updating an index of a corpus of resources from time to time to generate an updated index for use by a search engine. Change data specifying changes made by users affecting resources are recorded. An index search result based on the most-recently updated index is received in response to a user search query. The change data is searched to identify any changes to the resources made by the user that relate to the search query and if any such changes are found, a revised search result is generated from the changes and the index search result and provided to the user as a response to the first query.

21 Claims, 3 Drawing Sheets

SEARCHING INDEXED AND NON-INDEXED RESOURCES FOR CONTENT

TECHNICAL FIELD

This specification relates to searching for content.

BACKGROUND

A variety of information can be made available to users on a network, such as the Internet. Content stored by various content hosts can be obtained from a variety of sources, including users of the content hosts. Several applications provide a user with features that allow the user to add content to the hosts. For example, web site publishers include text editors in web pages to allow a user to add text resources and to upload the added resources to one or more content hosts. In this manner, resources can be collected from several users. Search engines, e.g., the Google™ search engine offered by Google Inc. (Mountain View, Calif.) enable a user to search for resources on the network. Users generally interact with search engines through web sites, such as www.google.com, where a user can enter a search query.

Search engine can search a searchable index generated from a corpus of resources on the network and identify resources that are responsive to the search query. Indexing the resources in the corpus allows for efficient searching.

SUMMARY

This specification describes technologies relating to searching indexed and non-indexed resources for content.

In general, one aspect of the subject matter described in this specification can be embodied in methods that include the actions of updating a computer-searchable index of a corpus of resources from time to time to generate an updated index for use by a search engine to provide index search results to search queries, the search results for any search query being based on a most-recently updated index, recording in a computer-readable memory change data specifying changes made by users affecting resources in the corpus, including recording for each change a respective user making the change, wherein each change is an addition of the respective resource to the corpus, a deletion of the respective resource from the corpus, or a modification of the respective resource in the corpus, the recorded changes occurring so late as not to be reflected in the most-recently updated index, receiving a first search query from a first user and a corresponding first index search result based on the most-recently updated index, wherein the first index search result includes resources indexed in the most-recently updated index that satisfy the query, and searching the change data recorded in the memory to identify any changes to the corpus of resources made by the first user that relate to the first search query and if any such changes are found, generating a revised search result from the changes and the first index search result and providing the revised search result to the first user as a response to the first query, and otherwise providing the first index search result to the first user as a response to the first query. Other embodiments of this aspect include corresponding systems, apparatus, and computer program products.

This, and other aspects, can include one or more of the following features. The change can be the modification of a resource associated with the first user, and wherein generating the revised search result can include determining that the modification causes the resource to no longer satisfy the first search query, and removing, from the first index search result, the resource. The change can be the modification of a resource associated with the first user, and wherein generating the revised search result can include determining that the modification causes the resource to satisfy the first search query, and adding the resource to the first index search result. The change can be the deletion of a resource, and wherein generating the revised search result can include removing, from the first index search result, the resource. The change can be the addition of a resource, and wherein generating the revised search result can include determining that the addition causes the resource to satisfy the first search query, and including, in the first index search result, the resource. A host can provide indexing services and searching services to users. The corpus of resources can be recorded in a table, and generating the revised search result from the changes and the first index search result can include searching the table for the recorded changes specifying changes made by the first user, and altering the first index search result to reflect the recorded changes.

Particular implementations of the subject matter described in this specification can be implemented so as to realize one or more of the following advantages. Search results that are presented to a user searching for resources reflect the state of resources as they have most recently been modified by the user. If a user searches for resources that the user has only recently changed on a content host, then the effect of the changed resources is reflected in the search results provided to the user, even if the changed resources are not yet indexed. In this manner, if the user changes a resource and immediately thereafter provides a search query related to the changed resource, the effect of the change can be reflected in the search results presented to the user. The latency of the system apparent to the user, with respect to the user changing resources in the corpus and searching for the changed resources, can be minimized.

The details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
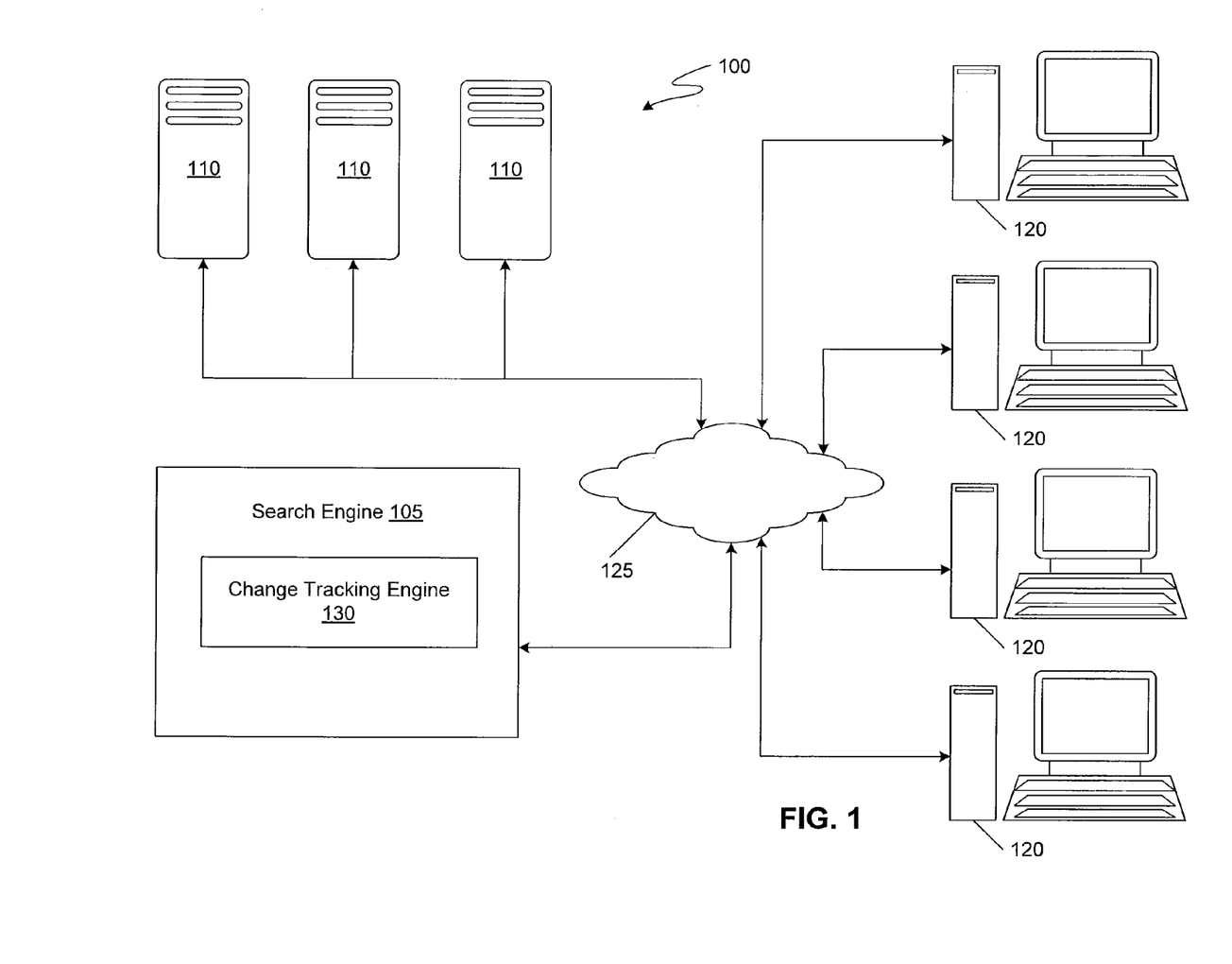
FIG. 1 is a schematic of an example of a system for searching for resources.

FIG. 1 is schematic of an example of a system 100 for searching for resources. The system 100 includes a search engine 105 to provide indexed search results identifying resources from an index in response to receiving search queries from a user, a change tracking engine 130 to track changes to resources modified by the user providing the search queries, one or more content hosts 110 hosting a corpus of resources, and several client devices 120 that communicate with the search engine 105, the change tracking engine 130, and the content hosts 110. The search engine 105, the change tracking engine 130, the content hosts 110, and the client devices 120 can communicate with one another over one or more networks 125. The content hosts 110 include servers that store and serve resources.

A corpus is a collection of resources, e.g., web pages, images, videos, and the like, stored in one or more content hosts and accessible to a search engine, against which the search engine runs its information retrieval processes. Generally, the resources are addressable by URIs (Uniform Resource Identifiers) on the Internet. Generally, corpora are dynamic rather than static; that is, a corpus and the resources that are part of it can change even while they are being searched or indexed.

Examples of networks 125 include local area networks (LANs), wide area networks (WANs), wireless (e.g., Wi-Fi) networks, mobile phone networks, the Internet, and the like.

In some implementations, the change tracking engine 130 of the system 100 resides in and is operatively coupled to the search engine 105 that indexes resources that are hosted by the content hosts 110. In other implementations, the search engine 105 resides in the change tracking engine 130, while, in alternative implementations, the search engine 105 resides outside and is operatively coupled to the change tracking engine 130. Examples of the resources in the corpus include documents (e.g., web pages, Portable Document Format (PDF) documents, text files, or word processing documents), audio files, video files, images, and the like. In some implementations, the identified resources include news articles, which include documents that include textual content, images, and the like. Users can access the resources in the content hosts 110 using the client devices 120, which can be any kind of user device, e.g., desktop computer, laptop computer, personal digital assistant (PDA), a web enabled mobile telephone, and the like, that is connected, through the one or more networks 125, to the content hosts 110. For example, a server, connected to the Internet, and hosting a website, can be a content host 110 storing and serving resources of the corpus, where the resources can include documents including textual content, that a user can access using a computer connected to the Internet. All resources of the corpus can be stored on the same content host 110 or, alternatively, can be distributed across several content hosts 110.

The search engine 105 creates a computer-searchable index of the corpus of resources. The search engine 105 updates the index from time to time, e.g., periodically, by generating a new index, where the new index reflects modifications to the resources in the corpus that occurred since the last updating of the index. The change tracking engine 130 monitors modifications to the resources accessed by a user in the corpus. The search engine 105 accesses the searchable index and provides index search results that include indexed resources in the index, in response to search queries. The search queries can be received from users operating client devices 120. The search engine 105 generates search results for search queries based on the most-recently updated index.

Resources stored not only in the content hosts 110, but also on user-local machines, can generally be changed. The change tracking engine 130 tracks change data specifying changes made by the users, and associates each change with the user making the change. The change can be an addition of a resource to the corpus, a deletion of a resource from the corpus, or a modification of a resource in the corpus. Changes made by users to a corpus generally occur between updates of the corresponding index and are not reflected in the most-recently updated index. The change tracking engine 130 tracks changes to resources as these changes occur. The change tracking engine 130 tracks changes to resources even while the search engine 105 updates the index, the change tracking engine 130, in parallel, tracks the change data that specify changes made by the users to resources. This change data is not reflected in the most-recently updated index.

In response to receiving a search query from a user, the search engine 105 searches the index and provides index search results that identify resources that satisfy the search query. The index search results include a list of addresses of the resources, e.g., URIs pointing to resources that can be used to retrieve the resources. The search engine 105 searches the most-recently updated index of resources to generate the search result. The change tracking engine 130 receives the search query and the corresponding index search result, and searches the change data to identify any changes made by the user who presented the query that may affect the index search result. If the change tracking engine 130 determines that the index search result is affected by the change data, then the change tracking engine 130 generates a revised search result from the changes and the index search result. The change tracking engine 130 provides the revised search result to the user. The revised search result accounts for changes to the resources that are not reflected in the index, because the index has not yet been updated to reflect the changes.

Figure 2:
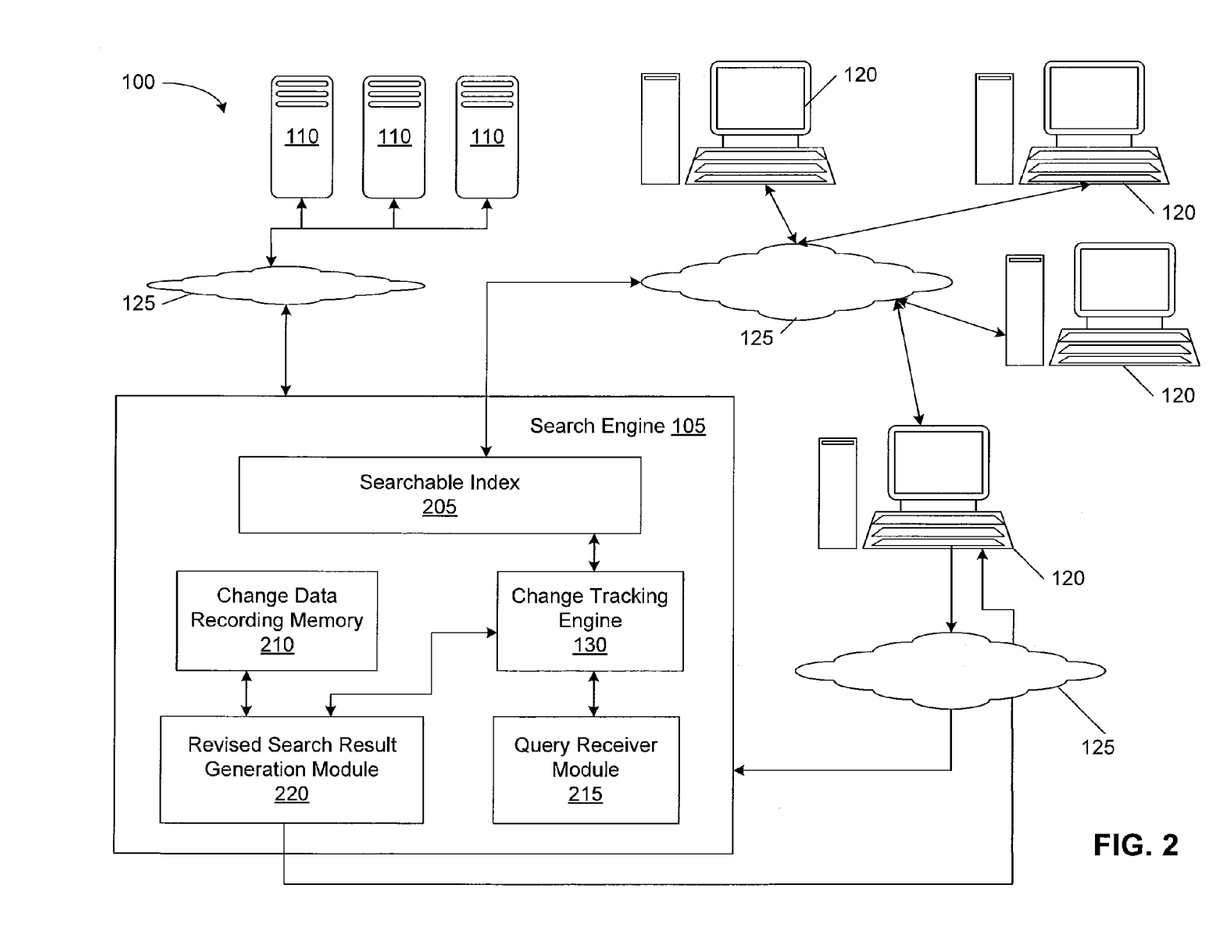
FIG. 2 is a schematic of an example of a system for searching for resources.

FIG. 2 is a schematic of an example of a system 100 for searching for resources. The content hosts 110 include the corpus of resources, where the content hosts include servers that store and serve the resources to users. Users access the corpus through client devices 120 that communicate with the content hosts 110 through one or more networks 125, e.g., the Internet. The search engine 105 and the change tracking engine 130 are operatively coupled to the content hosts 110 over the network 125, e.g., the Internet, thereby enabling the search engine 105 and the change tracking engine 130 to access the resources in the corpus 110. The search engine 105 includes a searchable index 205 of the corpus that is accessible by the search engine 105 to provide index search results that satisfy search queries received from users. The search engine 105 crawls the content hosts, where the resources are located, to identify resources available for indexing. In some implementations, the search engine 105 also stores copies of the indexed resources. In some implementations, the search engine 105 creates a table listing resources in the corpus including a content host 110 storing a respective resource, a user who created the resource, client devices accessing the resource, metadata related to the resource, and the like. The search engine 105 creates the searchable index from the resources listed in the table.

The change tracking engine 130 tracks changes to the resources in the corpus 110 in the table listing the resources, and also tracks there the user making each change. Each change would be an addition, deletion, or modification of a resource. The search engine 105 updates the searchable index 205 from time to time, e.g., by periodically generating a new searchable index of resources. In parallel, the change tracking engine 130 tracks changes to the resources in the corpus and updates the table listing all the resources in the corpus. The most recent index will generally not reflect the current state of the resources in the corpus. The system 100 includes a computer-readable memory in which the change tracking engine 105 records change data specifying changes made by users affecting resources in the corpus. The change data recording memory 210 can be a RAM, a semi-conductor memory, a non-volatile memory, a hard disk, and the like. In some implementations, the change data recording memory 210 resides in the search engine 105 and is operatively coupled to the change tracking engine 130. In other implementations, the change data recording module 210 resides in the change tracking engine 130. In some implementations, the change data can be represented on-disk as a b-tree that supports real-time updates.

In some implementations, the change data is tracked in the same table in which the corpus of resources is listed. A resource, and metadata related to the resource, are added to the table when it is created, and marked in the table when the resource is changed. In other implementations, tracking the change data is separate and distinct from tracking the resources using a table. Each change is associated with a respective user making the change The change tracking engine 130 tracks changes to resources as the changes occur. The search engine 105 indexes the resources in the corpus from time to time. At times, the recorded changes, stored as the change data in the change data recording memory 210, occur so late as not to be reflected in the most-recently updated index.

A user, searching for resources in the corpus, provides a search query using a client device 120. For example, the user, while browsing the Internet using a web browser, such as Internet Explorer, enters a search query in a text box of a web page of the website www.google.com. In response, the search engine 105 generates an index search result that satisfies the search query. In generating the index search result, the search engine 105 searches the most-recently updated index.

The change tracking engine 130 searches the change data recorded in the change data recording memory 210 to identify any changes made by the user that provided the search query to resources in the corpus 110. If the change tracking engine 130 finds such change data, then the change tracking engine 130 determines an effect of the change data on the index search result. For example, a resource that is deleted from the corpus should not be included in the search results. In removing such a resource from the index search result, the change tracking engine 130 generates a revised search result based on the changes and index search result. In another example, if a resource is added to the corpus after indexing and if the added resource satisfies the search query, then the added resource should be included in the search results. Further, if an indexed resource included in the search results has been modified such that the modifications cause the resource to satisfy or no longer satisfy the search query, then the resource should be added to or removed from the search results, respectively. Based on the modification to a resource, the change tracking engine 130 generates a revised search result.

In some implementations, the change tracking engine 130 can include a revised search result generation module 220 that can receive the search query and the index search result, and generate a revised search result that can be a modified version of the index search result, which, in this example, will exclude the deleted resource from the search results. The change tracking engine 130 provides the revised search result to the first user as a response to the first query. If the change tracking engine 130 finds no change data related to a user providing the query, the engine provides the index search result to the user as a response to the first query.

For example, a user can access a resource, such as a web page of a restaurant's website hosted by a content host 110, which the search engine 105 has previously included in the searchable index 205. The web page can allow a user to provide reviews about the restaurant, e.g., by entering comments in a text box located on the web page. Immediately following entering a review, the user can search for the review, e.g., by presenting a search query to the search engine 105, where the search query includes a word, words, or phrases that the user included in the review. The searchable index 205 can have previously been updated to include the restaurant's web page prior to the addition of the user's review. Consequently, the changes to the restaurant's web page may not be reflected in the most-recently updated index.

The change tracking engine 130 can record the added review as change data in the change data recording memory 210. The search engine 105 does not include the restaurant's web page from the searchable index 205 in the index search result. This is because the search engine 105 has determined that the restaurant's web page, without the added comments, is not responsive to the search query. Thus, the search engine 105 generates a search result that excludes the restaurant's web page with the user's review.

Alternatively, when the search engine 105 crawls the content hosts 110 to identify resources, the search engine 105 identifies new resources as well as changes to previously identified resources. The search engine 105 notifies the change tracking engine 130 of the new resources and changes to the identified resource. Upon being notified of changes to resources, the change tracking engine 130 determines the nature of the changes to the resources. In some implementations, the content hosts 110 transmit one or more change notifications to the change tracking engine 130 when resources at the content hosts are modified. Upon receiving the change notifications, the change tracking engine 130 determines the nature of the changes.

In some implementations, the content hosts 110 are configured such that changes to resources at the content hosts 110 automatically cause a notification to be transmitted to the change tracking engine 130. For example, the resource can be a web page that allows users to add comments. When a user adds comments into the web page and uploads the web page, the content host 110, where the web page is stored, sends a notification to the change tracking engine 130 that changes have been made to the web page. The change tracking engine 130 can subsequently determine the nature of the change.

When the change tracking engine 130 receives the search results, the change tracking engine 130 checks the stored change data for modifications to resources made by the user who presented the search query. The change tracking engine 130 finds the addition of the review to the restaurant's web page by the user, and determines that, due to the added comments, the change data is responsive to the search query provided by the user. For example, the change tracking engine 130 can scan the change data to identify resources that have been modified by the user who presented the search query. From among the modified resources, the change tracking engine 130 can identify the textual content added to the restaurant's web page, and determine that all or portions of the search query match portions of the textual content. In this manner, the change tracking engine 130 can identify the restaurant's web page as being responsive to the user's search query. Other methods can be used to identify resources that have been changed and stored in the change data recording memory 210. In such instances, the revised search result generation module 220 can include the restaurant's web page, to which the user recently added a review, to the index search result to generate a revised search result, and provide the revised search result to the user.

In some implementations, the change can be a modification of a resource, where the resource was modified by the user providing the search query. In such implementations, the change tracking engine 130 can determine that the modification causes a resource to no longer satisfy the search query, and remove the resource from the first index search result. For example, a user adds a review to a restaurant's web page, and uploads the review. During an updating of the searchable index, the restaurant's webpage including the user's review are indexed. Subsequently, the user deletes the review from the restaurant's web page. Shortly after deleting the comments, the user searches for the restaurant's web page by providing a search query containing words in the review that the user recently deleted. The deleting of the review occurred so late as to not be reflected in the most-recently updated index. The change tracking engine 130 records the deletion of review from the resource, namely, the restaurant's web page, as a change to the resource in the change data recording memory 210. When a user provides a search query including words from the deleted review, the search engine 105 includes the restaurant's web page, with the review, from the searchable index 205 in the index search result because when the searchable index was updated, the review was present in the resource. Based on the change data in the change data recording memory 210 and the index search result, the change tracking engine 130 determines that the news article no longer satisfies the search query. For example, the change tracking engine 130 scans the textual content of the restaurant's web page in the change data recording memory 210 and determines that the content of the search query is not found in the textual content of the restaurant's web page. Subsequently, the change tracking engine 130 provides the change data and the index search result to the revised search result generation module 220 to generate a revised search result that excludes the restaurant's web page and any references to the restaurant's web page. The revised search result is provided to the user.

Figure 3:
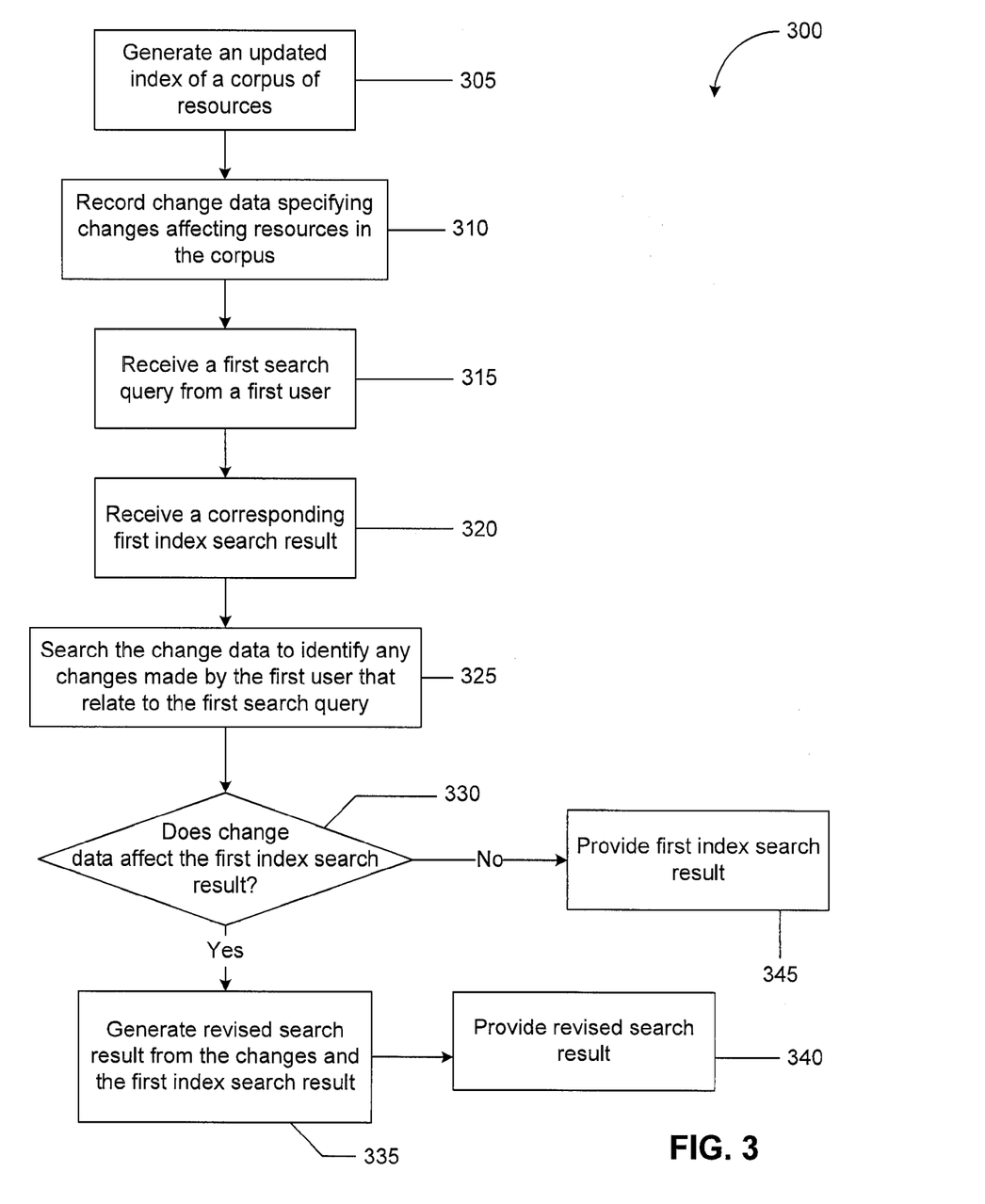
FIG. 3 is a flow chart of an example process for providing search results in response to search queries.

FIG. 3 is a flow chart of an example of a process 300 for providing search results in response to search queries. The process 300 generates an updated index of a corpus of resources (step 305). The process 300 records change data specifying changes affecting resources in the corpus (step 310). The process 300 receives a first search query from a first user (step 315). The process 300 receives a corresponding first index search result (step 320). For example, the search result can include resources or URIs that are addresses of the resources or both.

The process 300 searches the change data to identify any changes to resources made by the first user that relate to the first search query (step 325). For example, the change tracking engine 130 can determine if any change data recorded in the change data recording module 210 is associated with the respective user providing the first search query. The change tracking engine 130 can identify a list of resources that have recently been updated by the user and linearly scan the identified list. The change data can be an addition, a deletion, or a modification of the respective resource in the corpus. For example, the resource can be a web page of a website that has been included in the most-recently updated index. The user can add textual content to the web page, where the addition occurred so late as to not be reflected in the most-recently updated index. The change tracking engine 130 can record the added content as change data associated with the respective user. In another example, the user can delete a resource, e.g., a document, after the change tracking engine 130 has indexed the document. The change tracking engine 130 can record the deletion of the document as change data associated with the respective user. In another example, the resource can be a web page of a website, and the user can delete textual content on the web page and add an image to the web page. The deletion and the addition may not be reflected in the most-recently updated index, and can be recorded as change data in the change data recording module 210.

The process 300 can check if the change data affects the first index search result at 330. For example, the change tracking engine 130 can determine if the change data affects the first index search result at 330. The change tracking engine 130 identifies resources in the change data recording memory 210 that were modified by the user presenting the search query. Subsequently, the change tracking engine 130 scans the modifications to the resources to determine an effect of the modification on the responsiveness of the resource to the search query. For example, the change tracking engine 130 compares words and word phrases in the search query with textual content in the modified resources stored in the change data recording memory 210. If words and word phrases in the search query are found in the textual content in the modified resources and if the resources were not included in the index search result, then the change tracking engine 130 determines that the modified resources affect the index search result. Alternatively or in addition, if words and word phrases in the search query are not found in the textual content in the modified resources and if the resources were included in the index search result, then the change tracking engine 130 determines that the modified resources affect the index search result. Other methods for determining the responsiveness of content to a search query can also be used. Further, although this example pertains to textual content, the modifications can represent modifications to other types of content, e.g., images, audio, video, and the like, in resources, and the change tracking engine 130 can employ suitable search methods to determine the responsiveness of modified resources to a search query.

If the process 300 determines that the change data affects the first index search result, the process 300 generates a revised search result from the changes and the first index search result at 335. For example, if a user deletes a resource from the corpus of resources, and the most-recently updated index does not reflect the deletion, then the deletion is recorded as change data in the change data recording module 210. If a first index search result, generated in response to a first search query, includes the deleted resource, then the change tracking engine 130 can search the change data and identify that the deletion of the resource affects the first index search result. The revised search result generation module 220 can remove the deleted resource and any reference to the deleted resource from the first index search result.

In another example, a user can modify a resource, e.g., a web page of a website, by adding some textual content to the web page and removing some textual content from the web page. The modifications can occur so late as to not be reflected in the most-recently updated index. The change tracking engine 130 can record the modifications in the change data recording module 210. The search engine 105 can determine that the modified resource in the searchable index satisfies a first search query received from the user and include the modified resource in the first index search result. The change tracking engine 130 can search the change data and identify the modifications, and, further, determine that the deletions to the resource cause the resource to no longer satisfy the first search query. The revised search result generation module 220 can remove, from the first index search result, the modified resource and any reference to the modified resource.

In another example, a user can add a resource, e.g., a document, to the corpus. The addition can occur so late as to not be reflected in the most-recently updated index. The change tracking engine 130 can record the addition as change data in the change data recording module 210. In response to a first search query received from the user, the search engine 105 can generate a first index search result that does not include the added resource. If the change tracking engine 130 determines that the added resource satisfies the first search query, then the revised search result generation module 220 can include the resource in the first index search result. In implementations where references to resources are included in the revised search result provided to a user, the references can be inserted into the search result at or near the top of the list of references. In other implementations, the modified resource can be inserted at a position in the revised search result based on the relevance of the resource to the search query. For example, the relevance can be determined based on a rank of the modified resource. In some implementations, the modified resource can be placed at the top of the list of references in the search result regardless of the relevance of the resource to the search query.

The process 300 can provide the revised search result at 340. For example, the change tracking engine 130 can provide the revised search result generated from the changes and the first index search result, e.g., to the user who provided the first search query. Alternatively, the process 300 can provide the first index search result at 345. For example, if the change tracking engine 130 determines that the change data does not affect the first index search result, e.g., because no change data was received from the user who provided the search query or the change data did not cause the changed resource to satisfy the search query, the change tracking engine 130 can provide the first index search result to the user. In some implementations, the change tracking engine 130 can store the change data in a table and associate the change data with the respective user responsible for the change. To determine if the change data affects the first index search result, the change tracking engine 130 can search the table for the recorded changes specifying changes made by the user who provided the search query, and, if the change tracking engine 130 determines that the change data affects the first index search result, the change tracking engine 130 alters the first index search result to reflect the recorded changes.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results. The change tracking engine 130 can provide the search results as a list including uniform resource URLs pointing to the locations of the resources that satisfy the search query on the content hosts where the resources are stored. The search results can include URLs pointing to several resources and can span several pages. Further, the change tracking engine 130 can arrange the URLs in a descending order of relevance, where a resource determined to be likely most relevant to the search query is positioned at the top of the list. When change data is included in the revised search results, not only the number of resources in the search results, but also the relevance of the resources to the search query can be altered. The change tracking engine can include a pagination handler module (not shown) to modify the pagination of the URLs in the search result. For example, if the change data records the addition of a resource that is determined to be responsive to the search query, then the pagination handler module can re-arrange the pages across which the URLs pointing to locations of resources are displayed, subsequent to the change tracking engine 130 inserting the resource at an appropriate location in the index search result generated from the searchable index. Similarly, the pagination handler module can re-arrange the pages across which the search results are displayed when a resource is deleted from the search results. Also, when the pagination handler module can re-arrange the pages across which the search results are displayed when a modification to a resource alters the relevance of the resource to the search query.

In some implementations, the change tracking engine 130 can be employed to search for content in a desktop file system. The files can be periodically indexed to create a searchable index. Changes to files that occur so late as to not be reflected in the index can be recorded as change data. When a user searches for a file in the desktop file system, a first index search result can be generated from the index. The first index search result can be revised based on the changes to files and a revised search result can be generated and provided to the user. Accordingly, other implementations are within the scope of the following claims.

What is claimed is:

1. A computer-implemented method comprising:

updating a computer-searchable index of a corpus of resources from time to time to generate an updated index for use by a search engine to provide index search results to search queries, the search results for any search query being based on a most-recently updated index;

recording in a computer-readable memory change data specifying changes made by users affecting resources in the corpus, including recording for each change a respective user making the change, wherein each change is an addition of the respective resource to the corpus, a deletion of the respective resource from the corpus, or a modification of the respective resource in the corpus, the recorded changes occurring so late as not to be reflected in the most-recently updated index;

receiving a first search query from a first user and a corresponding first index search result based on the most-recently updated index, wherein the first index search result comprises resources indexed in the most-recently updated index that satisfy the query; and searching the change data recorded in the memory to identify any changes to the corpus of resources made by the first user that relate to the first search query and if any such changes are found, generating a revised search result from the changes and the first index search result and providing the revised search result to the first user as a response to the first query, and otherwise providing the first index search result to the first user as a response to the first query.

2. The method of claim 1, wherein the change is the modification of a resource associated with the first user, and wherein generating the revised search result comprises:

determining that the modification causes the resource to no longer satisfy the first search query; and removing, from the first index search result, the resource.

3. The method of claim 1, wherein the change is the modification of a resource associated with the first user, and wherein generating the revised search result comprises:

determining that the modification causes the resource to satisfy the first search query; and adding the resource to the first index search result.

4. The method of claim 1, wherein the change is the deletion of a resource, and wherein generating the revised search result comprises removing, from the first index search result, the resource.

5. The method of claim 1, wherein the change is the addition of a resource, and wherein generating the revised search result comprises:

determining that the addition causes the resource to satisfy the first search query; and including, in the first index search result, the resource.

6. The method of claim 1, wherein a host provides indexing services and searching services to users.

7. The method of claim 1, wherein the corpus of resources is recorded in a table; and generating the revised search result from the changes and the first index search result comprises:
   searching the table for the recorded changes specifying changes made by the first user; and
   altering the first index search result to reflect the recorded changes.

8. A computer program product, tangibly stored on a computer-readable medium, operable to cause data processing apparatus to perform operations comprising:
   updating a computer-searchable index of a corpus of resources from time to time to generate an updated index for use by a search engine to provide index search results to search queries, the search results for any search query being based on a most-recently updated index;
   recording in a computer-readable memory change data specifying changes made by users affecting resources in the corpus, including recording for each change a respective user making the change, wherein each change is an addition of the respective resource to the corpus, a deletion of the respective resource from the corpus, or a modification of the respective resource in the corpus, the recorded changes occurring so late as not to be reflected in the most-recently updated index;
   receiving a first search query from a first user and a corresponding first index search result based on the most-recently updated index, wherein the first index search result comprises resources indexed in the most-recently updated index that satisfy the query; and
   searching the change data recorded in the memory to identify any changes to the corpus of resources made by the first user that relate to the first search query and if any such changes are found, generating a revised search result from the changes and the first index search result and providing the revised search result to the first user as a response to the first query, and otherwise providing the first index search result to the first user as a response to the first query.

9. The computer program product of claim 8, wherein the change is the modification of a resource associated with the first user, and wherein generating the revised search result comprises:
   determining that the modification causes the resource to no longer satisfy the first search query; and
   removing, from the first index search result, the resource.

10. The computer program product of claim 8, wherein the change is the modification of a resource associated with the first user, and wherein generating the revised search result comprises:
   determining that the modification causes the resource to satisfy the first search query; and
   adding the resource to the first index search result.

11. The computer program product of claim 8, wherein the change is the deletion of a resource, and wherein generating the revised search result comprises removing, from the first index search result, the resource.

12. The computer program product of claim 8, wherein the change is the addition of a resource, and wherein generating the revised search result comprises:
   determining that the addition causes the resource to satisfy the first search query; and
   including, in the first index search result, the resource.

13. The computer program product of claim 8, wherein a host provides indexing services and searching services to users.

14. The computer program product of claim 8, wherein the corpus of resources is recorded in a table; and generating the revised search result from the changes and the first index search result comprises:
   searching the table for the recorded changes specifying changes made by the first user; and
   altering the first index search result to reflect the recorded changes.

15. A system comprising:
   a processor; and
   a computer-readable medium comprising instructions to cause the processor to perform operations comprising:
      updating a computer-searchable index of a corpus of resources from time to time to generate an updated index for use by a search engine to provide index search results to search queries, the search results for any search query being based on a most-recently updated index;
      recording in a computer-readable memory change data specifying changes made by users affecting resources in the corpus, including recording for each change a respective user making the change, wherein each change is an addition of the respective resource to the corpus, a deletion of the respective resource from the corpus, or a modification of the respective resource in the corpus, the recorded changes occurring so late as not to be reflected in the most-recently updated index;
      receiving a first search query from a first user and a corresponding first index search result based on the most-recently updated index, wherein the first index search result comprises resources indexed in the most-recently updated index that satisfy the query; and
      searching the change data recorded in the memory to identify any changes to the corpus of resources made by the first user that relate to the first search query and if any such changes are found, generating a revised search result from the changes and the first index search result and providing the revised search result to the first user as a response to the first query, and otherwise providing the first index search result to the first user as a response to the first query.

16. The system of claim 15, wherein the change is the modification of a resource associated with the first user, and wherein generating the revised search result comprises:
   determining that the modification causes the resource to no longer satisfy the first search query; and
   removing, from the first index search result, the resource.

17. The system of claim 15, wherein the change is the modification of a resource associated with the first user, and wherein generating the revised search result comprises:
   determining that the modification causes the resource to satisfy the first search query; and
   adding the resource to the first index search result.

18. The system of claim 15, wherein the change is the deletion of a resource, and wherein generating the revised search result comprises removing, from the first index search result, the resource.

19. The system of claim 15, wherein the change is the addition of a resource, and wherein generating the revised search result comprises:
   determining that the addition causes the resource to satisfy the first search query; and
   including, in the first index search result, the resource.

20. The system of claim 15, wherein a host provides indexing services and searching services to users.

21. The system of claim 15, wherein the corpus of resources is recorded in a table; and generating the revised search result from the changes and the first index search result comprises:

searching the table for the recorded changes specifying changes made by the first user; and altering the first index search result to reflect the recorded changes.

\* \* \* \* \*